(12) United States Patent
Fujioka

(10) Patent No.: US 6,971,573 B2
(45) Date of Patent: Dec. 6, 2005

(54) AUTOMATED TELLER MACHINE AND OPERATION METHOD THEREOF

(75) Inventor: Toshinori Fujioka, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 33 days.

(21) Appl. No.: 10/820,711

(22) Filed: Apr. 9, 2004

(65) Prior Publication Data

US 2004/0256450 A1    Dec. 23, 2004

(30) Foreign Application Priority Data

Apr. 10, 2003  (JP) ............................ 2003-106376

(51) Int. Cl.[7] ........................................... G06F 17/60
(52) U.S. Cl. .................................................... 235/379
(58) Field of Search .............................. 235/379, 380; 209/534; 271/298; 902/25

(56) References Cited

U.S. PATENT DOCUMENTS

| | | | |
|---|---|---|---|
| 4,625,870 A | * | 12/1986 | Nao et al. .................... 209/534 |
| 6,170,822 B1 | * | 1/2001 | Kato et al. ................... 271/298 |
| 6,481,620 B1 | | 11/2002 | Katou et al. |
| 2002/0121422 A1 | | 9/2002 | Shibata et al. |

FOREIGN PATENT DOCUMENTS

| | | | |
|---|---|---|---|
| EP | 1 008 965 A1 | 6/2000 | |
| JP | 6-119526 | 4/1994 | ............ G07D 9/00 |
| JP | 2001-118111 | 4/2001 | ............ G07D 9/00 |
| WO | WO 99/28225 | 6/1999 | |

* cited by examiner

*Primary Examiner*—Daniel Stcyr
*Assistant Examiner*—Daniel A. Hess
(74) *Attorney, Agent, or Firm*—Antonelli, Terry, Stout and Kraus, LLP.

(57) ABSTRACT

Plural bill accommodating boxes in a bill recycle machine are vertically superimposed. A bill accommodating section of each of the bill accommodating boxes is divided into a front-side accommodating section and a rear-side accommodating section. A bill transport path is provided at a front side and a back side of the plural bill accommodating boxes. Accordingly, the front-side accommodating section and rear-side accommodating section can individually store bills of different denominations and each of the bill accommodating boxes can be operated from, attached to and detached from the front side and back side. Further, a bill discriminating unit is provided on a route that connects the bill transport path of the divided bill accommodating boxes, wherein bills delivered from the front-side accommodating box, for example, pass through the bill discriminating unit and moves directly to the rear-side accommodating box. Reverse to this, bills in the rear-side of the accommodating box can be moved to the front-side.

18 Claims, 14 Drawing Sheets

F I G. 1
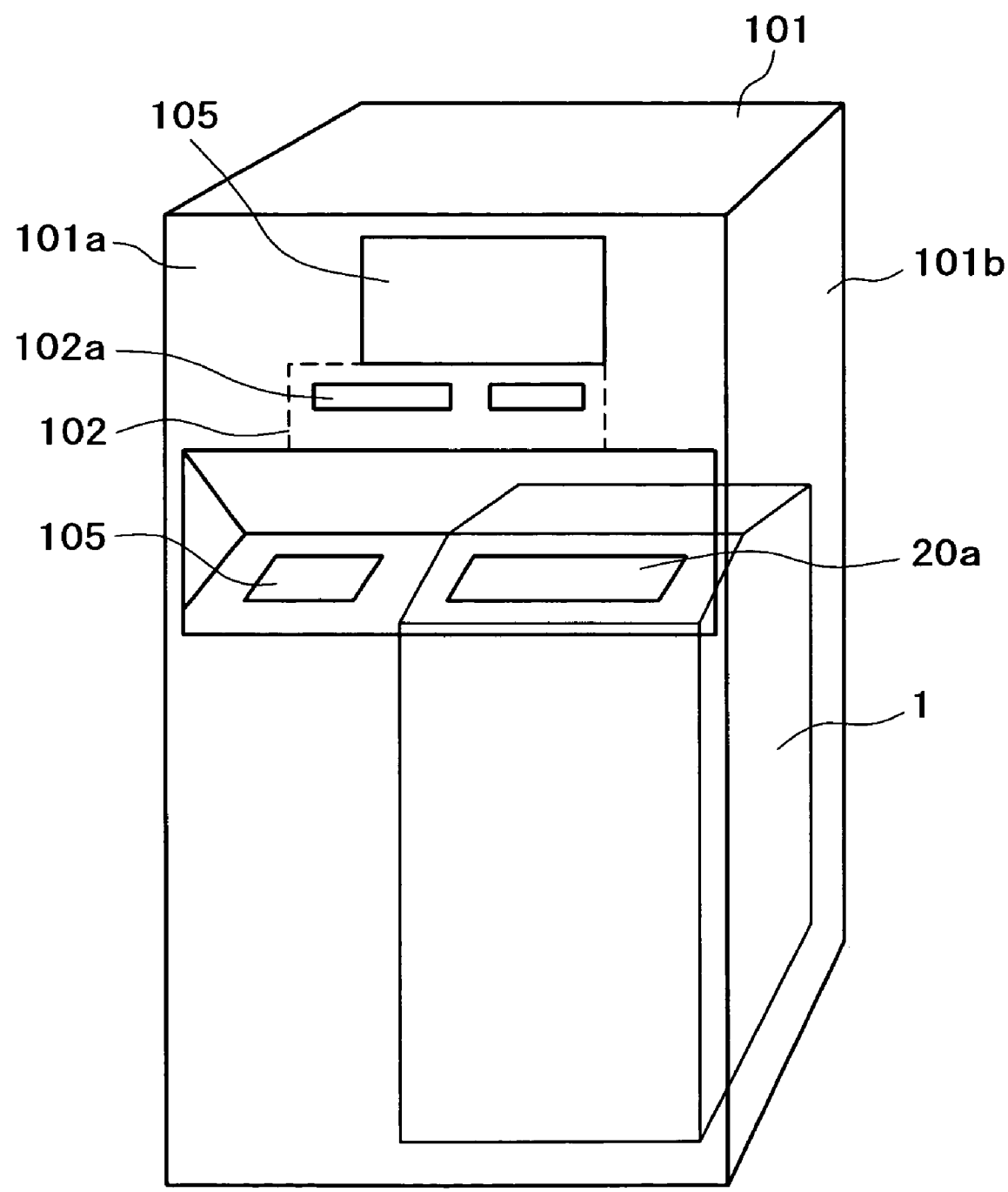

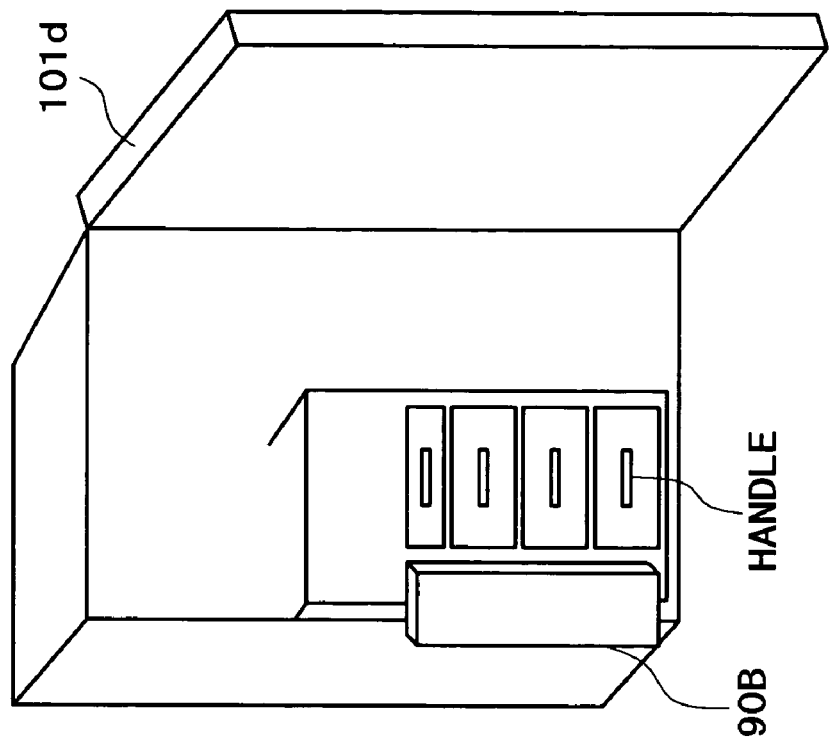
F I G. 6 A
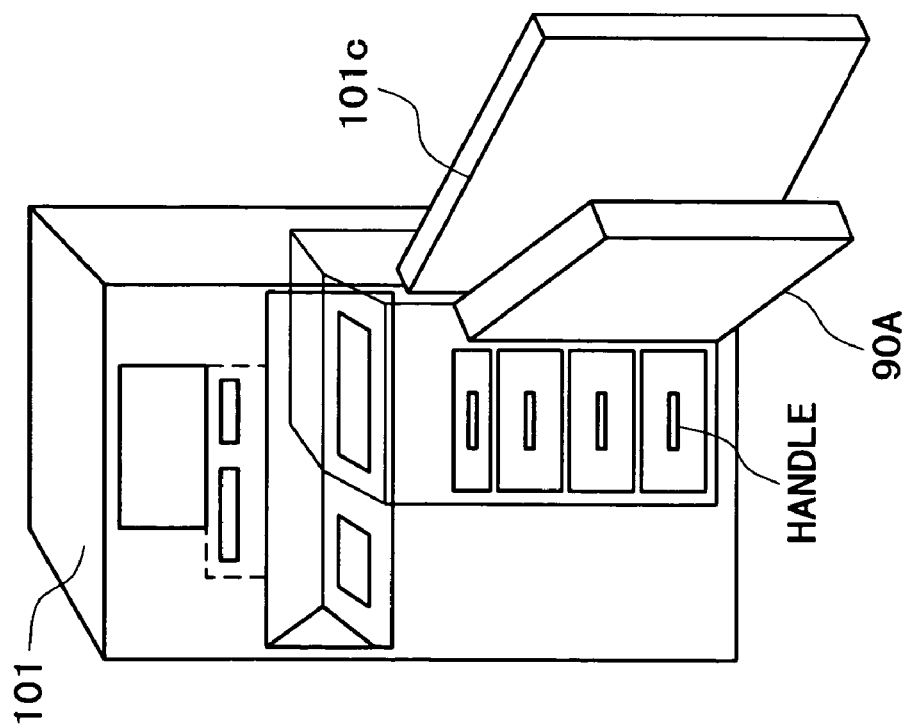
F I G. 6 B

AUTOMATED TELLER MACHINE AND OPERATION METHOD THEREOF

The present application claims priority from Japanese application JP2003-106376 filed on Apr. 10, 2003, the content of which is hereby incorporated by reference into this application.

BACKGROUND OF THE INVENTION

1. Field of the Invention

The present invention relates to an automated teller machine installed at financial institutions and the like for making a transaction such as the deposit and withdrawal of a bill according to the manipulation of a user.

2. Description of the Prior Arts

Conventionally, a bill recycle machine mounted in an automated teller machine used in, for example, financial institutions is provided with a bill deposit/withdrawal port, a bill discriminating unit for discriminating bills, and a bill transport path for transporting bills while passing them through the bill discriminating unit. The construction of the machine further includes the combination of units including a recycle box for accepting and delivering bills for both deposit and withdrawal, a non-circulating box for accepting deposited bills which are not accommodated in the recycle box or bills that are delivered from the recycle box or deposited, but not used for the withdrawal, a load/recovery box for delivering bills to be supplemented for the recycle box and accepting bills recovered from the recycle box, and so forth. Various constructions have been proposed for the arrangement of those units and for the route of the bill transport path that connects each unit.

Conventional example includes, for example, Japanese Published Unexamined Patent Application No. Hei 6-119526. This document discloses that a stacker is vertically arranged, wherein bills are intended to be taken out or in from both upper section and lower section of the stacker. However, in the construction shown in the Patent Reference 1, it is difficult to create a space for entering bills by an impeller against the downward force that is exerted by own weight of bills. In particular, folded bills are difficult to be entered. Further, in the case where bills having a different size are accommodated, the delivery thereof is also difficult.

Moreover, there has been known a construction in which each bill accommodating box is horizontally mounted, and several units are superimposed (for example, Japanese Published Unexamined Patent Application No. 2001-118111). There may be a case where denominations of money/bill to be accommodated are intended to be increased. For example, during a period when a current bill and a newly designed bill are intermingled, a need arises to increase a kind of bill to be handled. When the bill accommodating box is further superimposed to cope with this need, a height of a bill withdrawal port or bill deposit port is increased, so that it is difficult to be used considering the height of a user or a user on a wheel chair.

With the globalization of industry and economy, there arises a need that an automated teller machine can handle various kinds of money. In Europe, the conventional national bills are non-circulated to be collected but euro bills are circulated with the changeover to euro since 2002, whereby it is necessary to discriminate conventional bills from euro bills for use. Further, as a countermeasure of forged bills, it is required that bills deposited to the automated teller machine are discriminated and the bills that are judged to be forged are separately stored and managed in the accommodating unit in the machine. Moreover, the neighboring countries of the eurozone demand an automated teller machine that can handle euro bills in addition to national currencies. In other countries too, there arises a need to handle, for example, dollar bills in addition to the national currencies.

On the other hand, 2000-yen bills have been issued since 2000 as a new denomination. Further, newly designed bills are expected to be issued from 2004 as a countermeasure to the increase in damage by forged bills. The automated teller machines already installed are required to be remodeled on the spot to cope with this as much as possible. Newly installed automated teller machines are required not only to additionally handle 2000-yen bills but also to discriminate current bills from newly designed bills for use, since the current bills are non-circulated to be collected but the newly designed bills are circulated while the current bills and newly designed bills that will be intermingledly put into circulation from 2004 have the same denomination. As described above, the kinds of bills that should be handled increase.

For labor-saving, there is a hope for shortening a time that a clerk in charge spends on supplementing, collecting and examining carefully bills to, from and in the bill recycle machine or for reducing the number of times that the machine stops. Moreover, bills that cannot be discriminated at the bill discriminating unit are, once accommodated in the non-circulating unit, not utilized for withdrawal until they are taken out by a clerk in charge, which is one cause of inefficient use of funds. When the non-circulating unit is full, the automated teller machine should be stopped until the clerk in charge hastens to the machine to take out bills fully stacked in the non-circulating unit.

As described above, the automated teller machine is more and more desired to be capable of accommodating therein bills of many denominations, handling the same and flexibly and effectively use the same, in order to cope with the bill circulating amount that always changes due to the monetary changeover, changeover to newly designed bills or issue of a new denomination.

The automated teller machine is desired to install therein a bill recycle machine that can meet these needs and has high general-purpose ability.

SUMMARY OF THE INVENTION

The present invention aims to provide a bill recycle machine capable of realizing to handle bills of many denominations, shorten the time that a clerk in charge spends on operating the machine and improve the efficiency of use of funds, while assuring conventional function, performance and size, and an automated teller machine incorporating therein the bill recycle machine.

In order to attain the abovementioned object, a bill recycle machine installed in an automated teller machine of the present invention has a deposit/withdrawal port, bill discriminating unit, plural bill accommodating boxes and a bill transport path that passes through the bill discriminating unit for connecting the deposit/withdrawal port and the bill accommodating boxes. Each of the plural bill accommodating boxes is laterally placed and vertically superimposed. Each of the plural bill accommodating boxes has a bill accommodating section divided into a front-side and rear-side to be used as a recycle box. The bill transport path is provided at the front side and back side of each of the plural bill accommodating boxes. The front-side and the rear-side of each bill accommodating box can individually store bills of different denominations. Further, each of the bill accommodating boxes can be operated from the front side and back side.

Moreover, the bill discriminating unit is provided on the route that connects the bill transport path of the divided bill accommodating boxes, wherein bills delivered from the front-side accommodating section, for example, pass through the bill discriminating unit and moves directly to the rear-side accommodating section. Reverse to this, bills in the rear-side of the accommodating section can be moved to the front-side.

Further, separate accommodated bills are defined for the front-side and rear-side accommodating sections, so that they can be used for the deposit and withdrawal. Each of the accommodating boxes set at each position can freely be defined as a load/recovery box, non-circulating/storage box and recycle box. The non-circulating box is used as the recycle box, too, whereby a bill that has once been handled as a non-circulated bill is delivered again to be discriminated, and when it can be discriminated, it is used as a bill for withdrawal.

BRIEF DESCRIPTION OF THE DRAWINGS

Preferred embodiments of the present invention will now be described in conjunction with the accompanying drawings, in which;

FIG. 1 is a perspective view showing an appearance of an automated teller machine of one embodiment to which a first embodiment of the present invention is applied;

FIG. 6A and FIG. 6B are views showing an operation method of the automated teller machine shown in FIG. 1;

DESCRIPTION OF THE PREFERRED EMBODIMENTS

Figure 2:
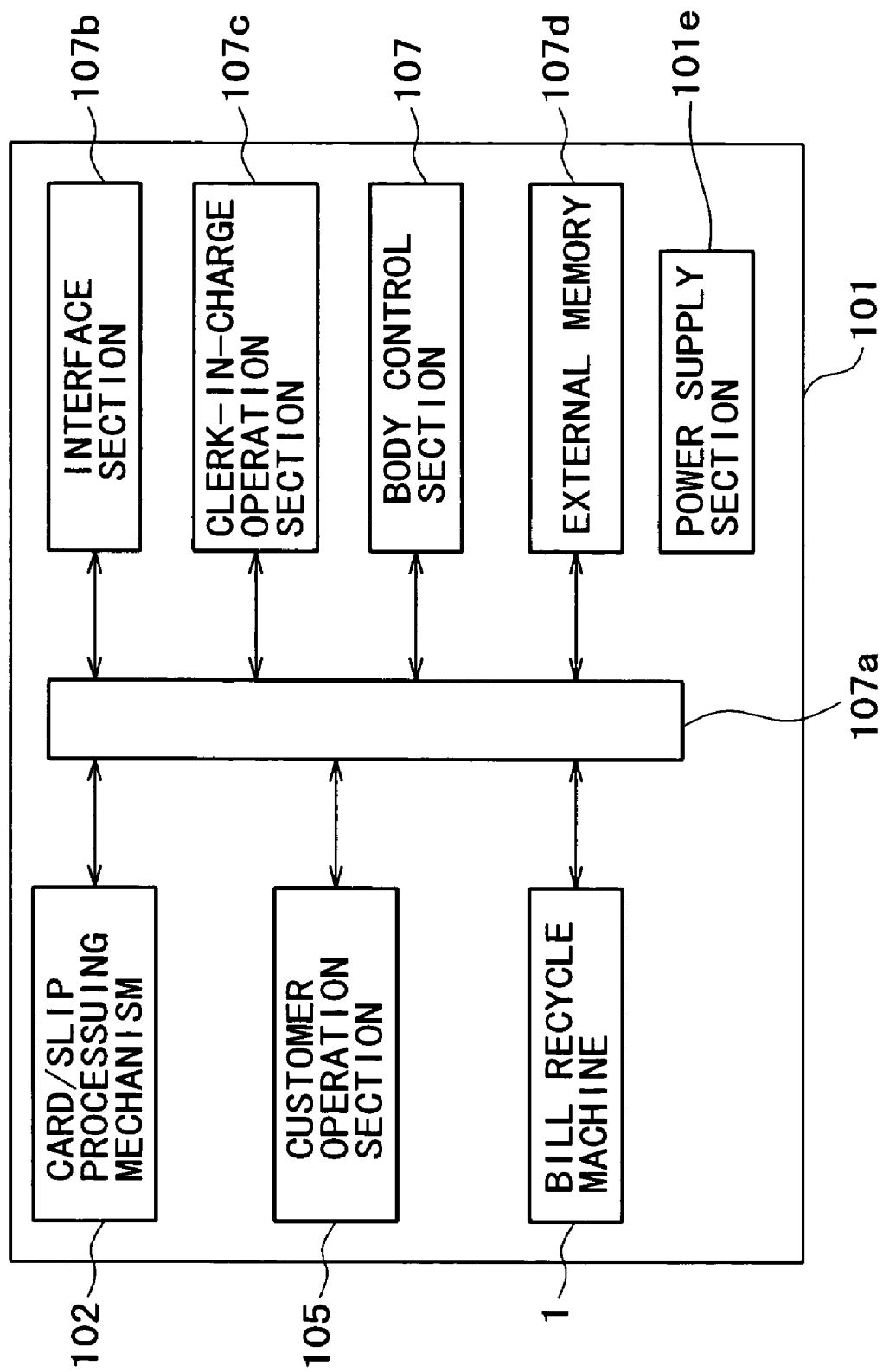
FIG. 2 is a block diagram showing a control relationship in the automated teller machine according to the embodiment of the invention.

A first embodiment of the present invention will be explained hereinbelow in detail with reference to the drawings. FIG. 1 is a perspective view showing an appearance of an automated teller machine to which the present invention is applied. An upper inside portion of an automated teller machine 101 is provided with a card/slip processing mechanism 102 which communicates with a card slot 102a provided in an upper front plate 101a to process a user's card and prints and delivers a transaction particulars slip, and a customer operation section 105 for displaying and inputting the contents of a transaction. A lower inside portion of the automated teller machine 101 is provided with a bill recycle machine 1 for processing bills, and a bill slot 20a is formed in front of it. This automated teller machine 101 can execute a user's transaction processing such as a deposit, payment, transfer and the like.

FIG. 2 is a block diagram showing a relation in control of the present machine. The card/slip processing mechanism 102, the bill recycle machine 1 and the customer operation section 105 provided in the automated teller machine 101 are connected to a body control section 107 through a bus 107a as described above and perform their required operations under the control of the body control section 107. Though the body control section 107 is also connected through the bus 107a to an interface section 107b, a clerk-in-charge operation section 107c and an external memory 107d, in addition to the abovementioned sections, to make the communication of necessary data therewith, the detailed description thereof will be omitted since there is no direct relation with the features of the present invention. Reference numeral 101e shown in FIG. 2 denotes a power supply section for supplying electric powers to the abovementioned mechanisms and components.

Figure 3:
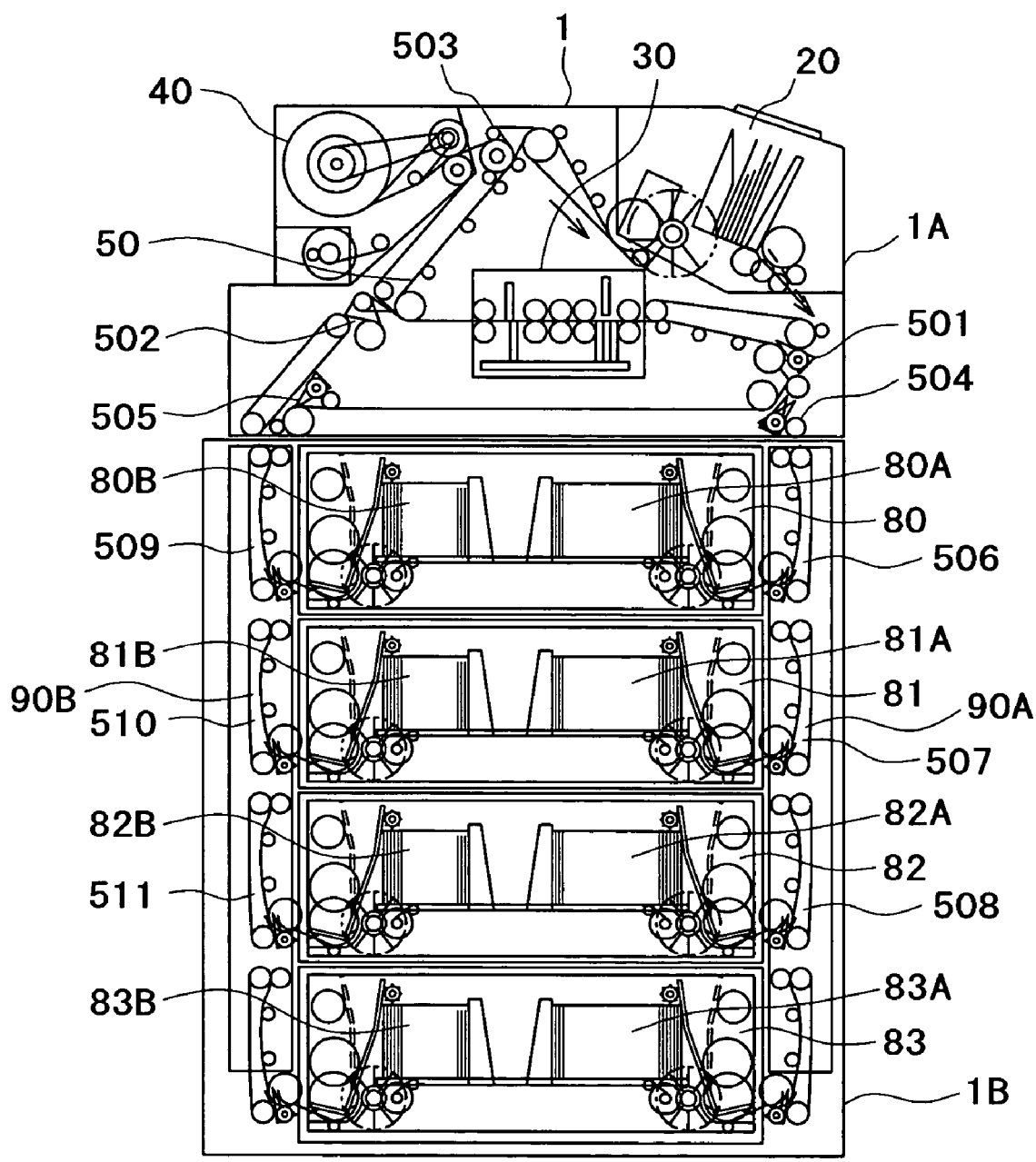
FIG. 3 is a side view showing a bill recycle machine according to a first embodiment of the invention.

FIG. 3 is a side view showing the construction of the bill recycle machine 1 in the automated teller machine shown in FIG. 1 to which the present invention relates. The bill recycle machine 1 is composed of a deposit/withdrawal port 20 for which a user makes the input/take-out of bills, a bill discriminating unit 30 for discriminating bills, a temporary storage box 40 for temporarily storing deposited bills until a transaction is concluded, bill accommodating boxes 80, 81, 82 and 83, a bill transport path 50 for transporting bills to the deposit/withdrawal port 20, the temporary storage box 40 and the bill accommodating boxes 80, 81, 82 and 83 while passing the bills through the bill discriminating unit 30, and a control unit not shown. The bill accommodating box 80 is composed of anon-circulating box 80A for accepting bills that are determined not to be used for the deposit and withdrawal as a result of the bill determination and a stacking box 80B that collects and stores bills which the user forgets to take out. The bill accommodating box 81 has a load/recovery boxes 81A, 81B in which bills that are to be set in each of the recycle boxes 82, 83 are loaded or which accepts the collected bills from each of the recycle boxes 82, 83. The bill accommodating boxes 82 and 83 are two recycle boxes 82 and 83 that accept bills for which a transaction is concluded and serve those bills for the withdrawal, and have front-side accommodating sections 82A and 83A and rear-side accommodating sections 82B and 83B.

Figure 4:
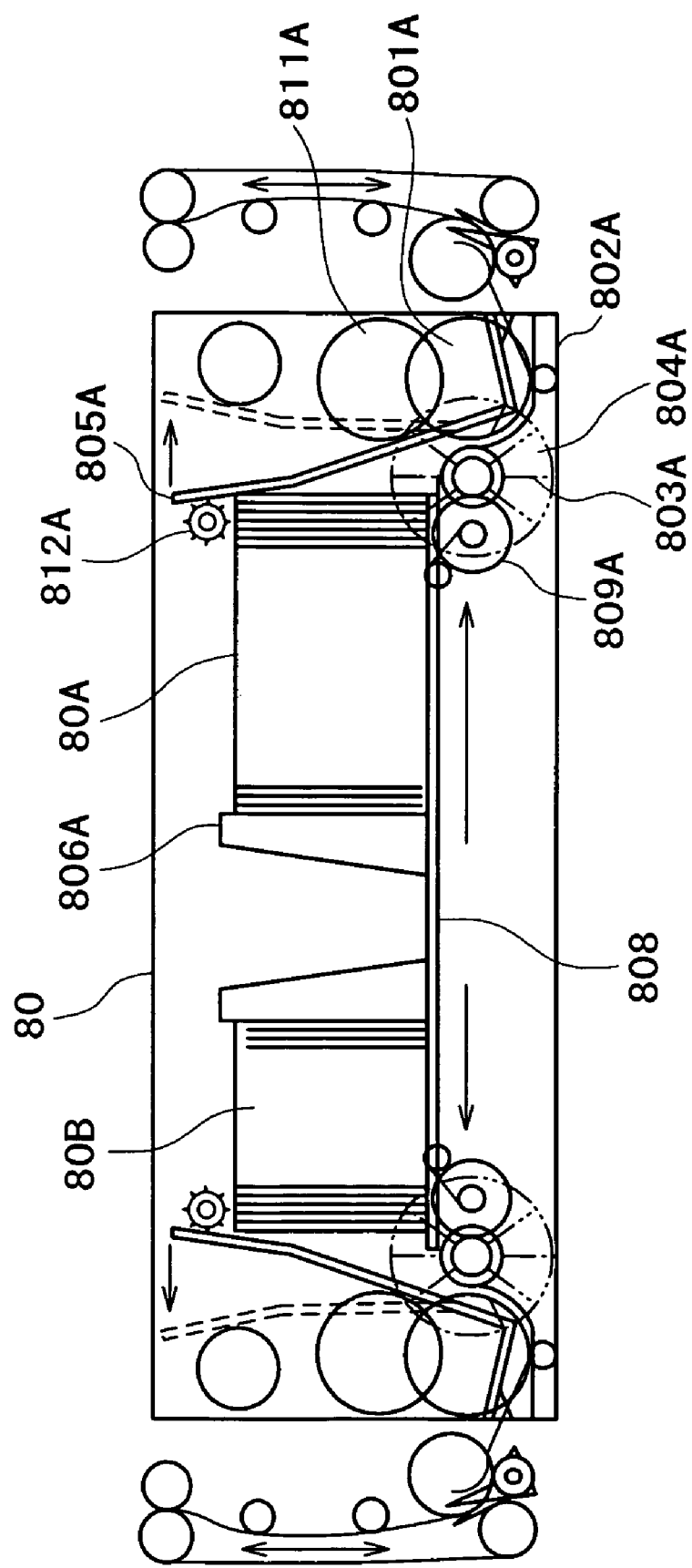
FIG. 4 is a side view showing a bill accommodating box according to a first embodiment of the embodiment of the invention.

FIG. 4 shows an inside construction of each of the bill accommodating boxes 80, 81, 82 and 83. Each of the bill accommodating boxes 80, 81, 82 and 83 has the same inside construction, but its use is different from each other depending upon the position to be set. The explanation is made taking the bill accommodating box 80 as an example. It is a recycle box which is capable of accepting and separately delivering bills. The front-side accommodating section 80A and the rear-side accommodating section 80B are longitudinally symmetrical. At the front-side accommodating section 80A of the bill accommodating box 80, a separation mechanism is composed of a rotating stack/feed roller 801A and a rotating pickup roller 811 which are driven through gears by driving sources (not shown), a rotating backup roller 802A, a gate roller 803A which rotates in the stacking direction but does not rotate in the delivering direction, a brush roller 804A arranged coaxial with the gate roller 803A and having elastic members radially arranged, and a separation/stack guide 805A that operates to change its position at the time of separation and at the time of stacking.

Bills are stacked in an accommodating space enclosed by a bottom plate 808, a push plate 806A and the separation/stack guide 805A. The stacking box 80A is further provided with a rotating upper scratch roller 812A disposed with a sawtooth-like periphery form in the vicinity of the separation/stack guide 805A in an upper portion of the accommodating section, and a rotating lower scratch roller 809A disposed with a sawtooth-like periphery form in the vicinity of the gate roller 803A in a lower portion of the accommodating section, so that the sawtooth-like periphery portions support the upper and lower ends of a accommodated bill to maintain a standing condition of the bill while scratching the bill on a push plate 806A side. This construction allows to facilitate accommodating and separating operations compared to the case where the size of a bill in the transporting direction is different, or to the case where bills are placed laterally.

At the time of separating operation, the separation/stack guide 805A rotates in a direction shown by an arrow to be moved to a position indicated by a broken line and the push plate 806A moves in a direction shown by an arrow in the accommodating space, thereby moving bills to be delivered in such a manner that predetermined pushing force is imposed upon the bills by the pickup roller 811A owing to a spring not shown. The bills pushed against the pickup roller 811A are delivered by the rotating stack/feed roller 801A and are transported one by one while double-feed is prevented by the gate roller 803A which does not rotate in the delivering direction.

At the time of stack operation, the separation/stack guide 805A is moved to a position indicated by a solid line and the push plate 806A moves in the accommodating space owing to driving sources (not shown) outside the accommodating section to make the controlled movement of the accommodated bills in a direction receding from the separation/stack guide 805A so that an entering bill transported in a direction of an arrow and the accommodated bills do not interfere with the increase in number of accommodated bills. At this time, the upper scratch roller 812A rotates clockwise and the lower scratch roller 809A rotates counterclockwise, so that the sawtooth-like periphery portions support the upper and lower ends of a stacked bill to maintain a standing condition of the bill while scratching the bill on the push plate 806A side. The rear-side stacking box 80B of the bill accommodating box 80 has the same construction and operation.

Figure 5:
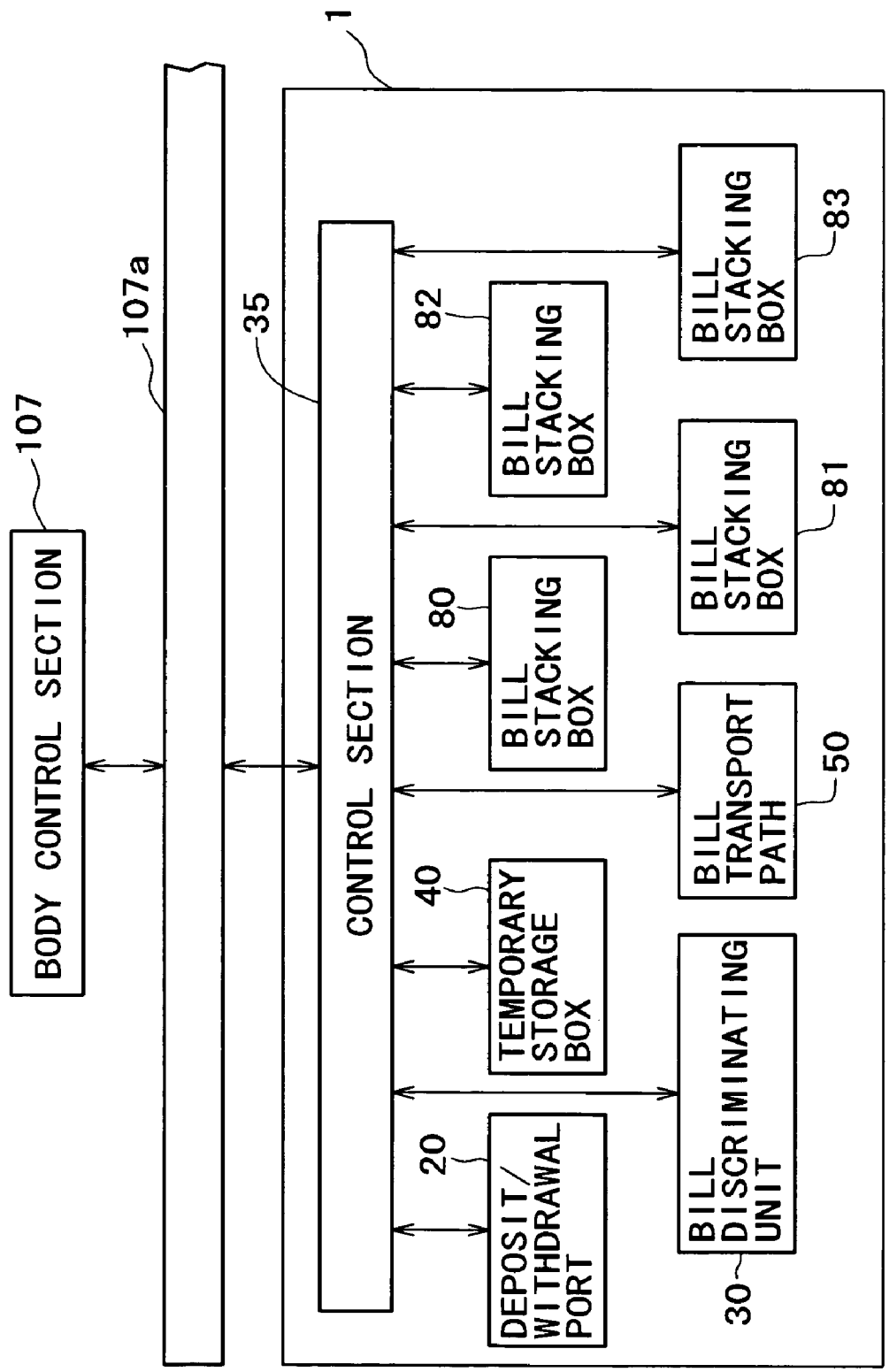
FIG. 5 is a block diagram showing a control relationship in the bill recycle machine according to the embodiment of the invention.

The control unit 35 is connected to the body control section 107 of the machine through the bus 107a, as shown in FIG. 5. The control unit 35 performs the control of the bill recycle machine 1 in accordance with a command from the body control section 107 and the detection of the state of the bill recycle machine 1 and sends the state of the bill recycle machine 1 to the body control section 107, as required. The control unit 35 is connected to a driving motor, electromagnetic solenoid or sensor of each unit (the deposit/withdrawal port 20, the bill discriminating unit 30, the temporary storage box 40, the bill transport path 50, the bill accommodating boxes 80, 81, 82 and 83) in the bill recycle machine 1 to drive-control actuators in accordance with transactions while monitoring the states by use of the sensors.

The bill recycle machine 1 is composed of an upper transport mechanism 1A composed of the deposit/withdrawal port 20, the bill discriminating unit 30, the temporary storage box 40 and the bill transport path 50 and a lower bill mechanism 1B composed of the bill accommodating boxes 80, 81, 82 and 83 and transport paths 90A and 90B that can be opened and closed and arranged at front and back sides of each bill accommodating box. It should be noted that the control unit 35 is omitted in the figure.

The bill recycle machine 1 constructed in the above manner is mounted inside a lower portion of the automated teller machine 101 as shown in FIG. 1. It is possible to employ a front side operation type or a back side operation type depending upon the type of the machine, and the construction correspondingly varies somewhat. As shown in FIG. 6A, the front side operation type machine, on a front side of which a clerk in charge performs operation, is constructed such that a front door 101c can be opened and closed, and when, as shown in the figure, the front door 101c is opened and the front-side open/close transport path 90A of the bill recycle machine 1 is opened, bill accommodating boxes each provided with a handle appear. The clerk in charge can pull out the respective accommodating boxes with the handle to perform operations such as replenishment and recovery of bills, and other maintenance work.

Meanwhile, as shown in FIG. 6B, the back side operation type machine, on a back side of which a clerk in charge performs operation, is constructed such that a back door 101d can be opened and closed, and when, as shown in the figure, the back door 101d is opened and the back-side open/close transport path 90B of the bill recycle machine 1 is opened, the bill accommodating boxes each provided with a handle appear. The clerk in charge can pull out the respective bill accommodating boxes with the handle to perform operation.

The application of the construction in which the front and back open/close transport paths 90A and 90B are provided in the vicinity of the front door and back door of the lower bill mechanism 1B facilitates replenishment and recovery operations of bills or operation for removing jammed bills when abnormality occurs, thus improving operability. Further, the operation of the clerk in charge can be conformed to both the front operation type and the back operation type by merely disposing the opening and closing door in the front face or back face.

Further, the bill transport path 50 is a one-way bill transport path for transporting bills only in the direction shown by an arrow only before or after the deposit/withdrawal port 20 at the upper section of the bill recycle machine 1, but other than that, the bill transport path 50 is a two-way transport path that is switched to either one of two-way directions per transaction for transporting bills. The bill transport path 50 is driven by a driving motor not shown, wherein the rotational direction of the motor is changed over for every transaction shown in the typical views of FIGS. 8 to 14. Moreover, switching gates 501, 502, 503, 504 and 505 and switching gates 506, 507, 508, 509, 510 and 511 for the open/close transport path are provided at the branch points of the bill transport path 50, so that the bill transport direction is changed over per transaction.

In the bill transport path 50, the open/close transport paths 90A and 90B that are provided at the front side and back side of the bill accommodating boxes 80, 81, 82 and 83 at the lower bill mechanism 1B are constructed so as to be integrally opened and closed. In the front side operation type machine shown in FIG. 6A, the clerk in charge opens the front-side open/close transport path 90A, while in the back side operation type machine shown in FIG. 6B, he/she opens the back-side open/close transport path 90B, whereby he/she can operate the bill accommodating boxes 80, 81, 82 and 83.

Figure 7:
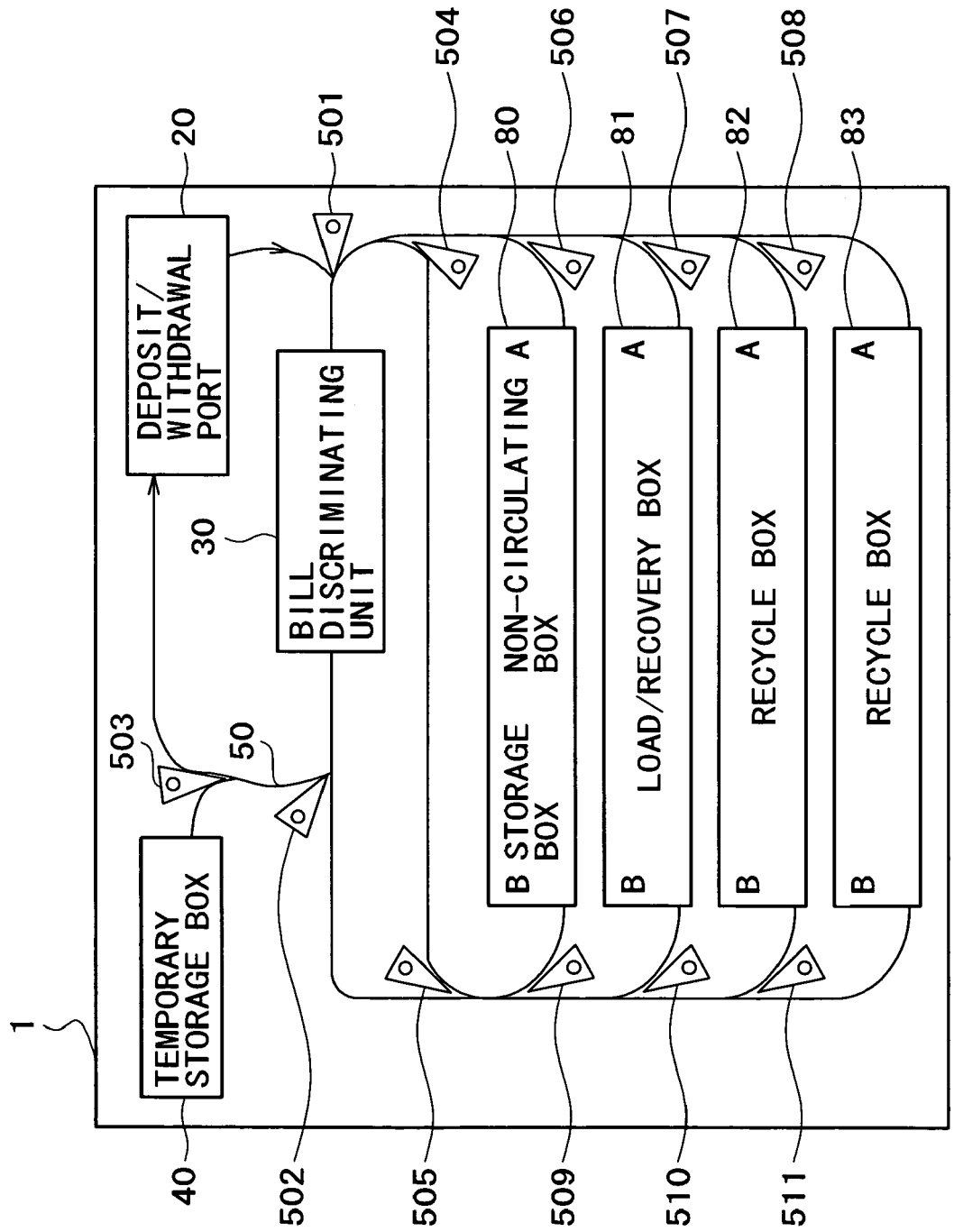
FIG. 7 is a typical sectional view showing a construction of a bill transport path according to the first embodiment of the invention (No. 1)

FIG. 7 typically shows a manner of using one cassette wherein the relationship between the bill transport path shown 50 in FIG. 3 and each unit (20, 30, 40, 80 to 83) is represented as a first embodiment. The details and operations of each of the abovementioned units (20, 30, 40, 80 to 83) in this embodiment will be explained hereinbelow.

Referring again to FIG. 3, though the details are not shown, the bill discriminating unit 30 is composed of a two-sheet detecting portion which includes a pair of rollers and detects the displacement of the rollers at the time of transport of bills between the rollers to detect whether or not there is the superimposition of two sheets one over the other, and a discriminating portion which detects the print of a bill by means of an image sensor and the like to discriminate the denomination and authenticity of that bill. The control unit 35 is informed of the result of discrimination for each passed bill. The bill discriminating unit can transport bills from both left and right sides in the figure.

The bill accommodating box 80 is used such that a front-side accommodating section (A) is used for a non-circulating box 80A while a rear-side accommodating section (B) is used for a storage box 80B. The non-circulating box 80A that is the front-side accommodating section (A) stores bills that are not accommodated in the recycle boxes 82 and 83 (not used for the withdrawal) at the deposit transaction or bills whose denomination cannot be discriminated at the bill discriminating unit at the withdrawal transaction or bills whose transporting state is abnormal. The storage box 80B that is the rear-side accommodating section (B) stores bills that a user forgets to take out for continuing the next user's transaction, in the case where the user forgets to take out the withdrawing bills.

The bill accommodating box 81 is used as a load/recovery box 81 as follows. Specifically, a clerk in charge does not set required bills into the recycle boxes 82 and 83 per denomination, but the clerk in charge sets bills en bloc into the load/recovery box 81 and the set bills are accommodated into the accommodating sections A and B of the recycle boxes 82 and 83 automatically in the machine. On the other hand, when the box is full with bills, a clerk in charge does not extract bills individually from the accommodating sections A and B of the recycle boxes 82 and 83 but bills are automatically collected from the accommodating sections A and B of the recycle boxes 82 and 83 into the load/recovery box 81 by a predetermined number. Moreover, the load/recovery box 81 is also used for accommodating bills whose denomination cannot be determined at the bill discriminating unit and bills whose transported state is abnormal at the time of loading.

Subsequently explained is an action of the bill recycle machine of the present embodiment by using typical views of FIGS. 8 to 14 (see FIG. 3 about the detailed construction and reference numerals).

Figure 8:
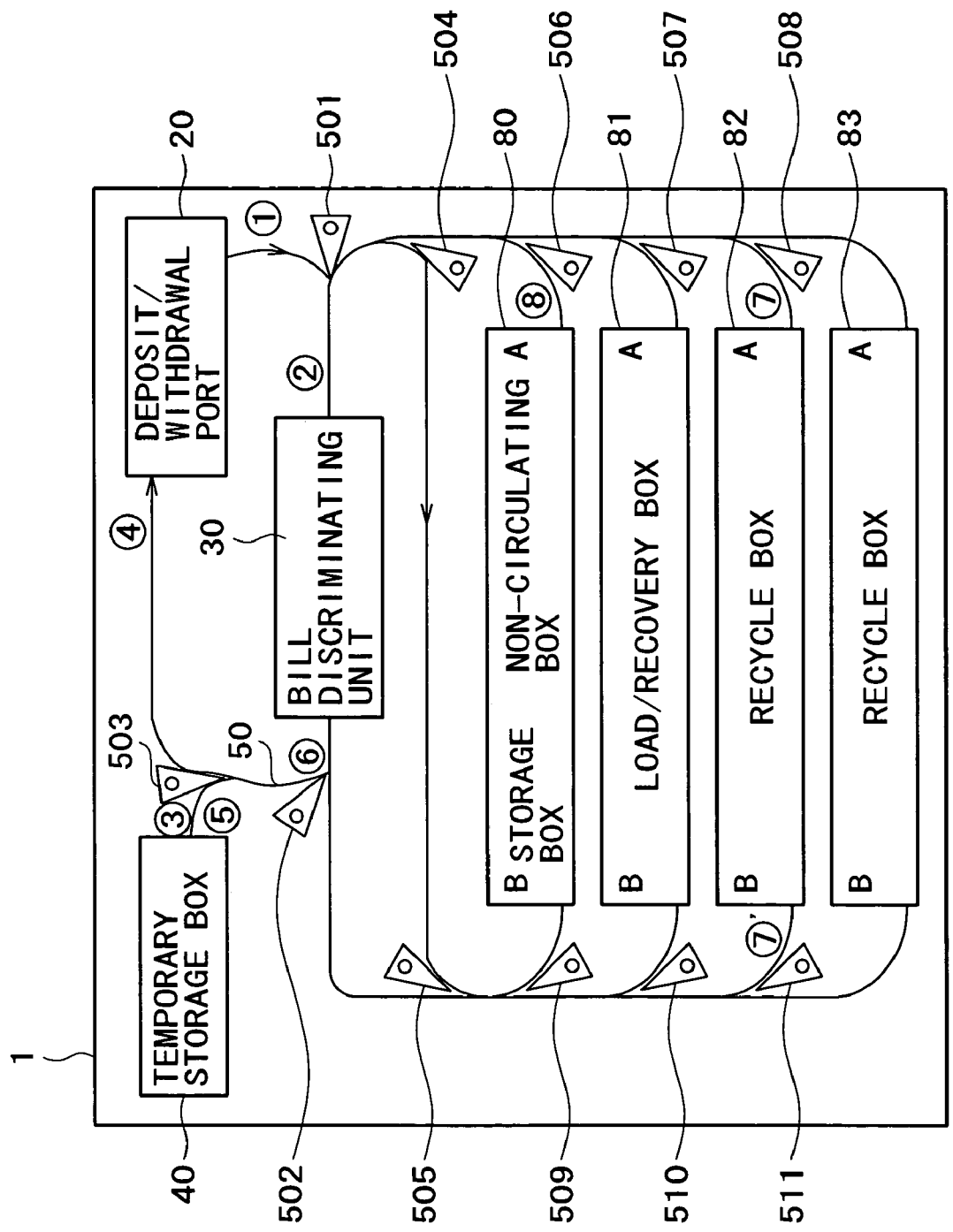
FIG. 8 is a typical sectional view showing a construction of a bill transport path according to the first embodiment of the invention (No. 2)

The case of the deposit transaction is shown in FIG. 8. An action of the machine includes a deposited money counting action for counting bills deposited by a user, and a deposited money storage action for storing bills in individual accommodating boxes per denomination after a user has confirmed the counted amount of money. At the deposited money counting action, bills charged into the deposit/withdrawal port 20 are: (1) separated one by one to be delivered to the transport path 50; (2) the denomination and authenticity of bills are discriminated at the bill discriminating unit 30; (3) the bills having been discriminated are temporarily stored in the temporary storage box 40; and (4) a bill or bills, which the bill discriminating unit 30 could not discriminate or a bill or bills, of which reception is rejected due to a tilt or abnormal spacings between bills, are not taken into the temporary storage box 40, but are stored in the deposit/withdrawal port 20 to be returned to the user.

After the user performs input operation of the confirmation to the counted amount of money, (5) the bills in the temporary storage box 40 are delivered in the reverse direction to the transport path 50 in the sequence reverse to that at the storing case; (6) the denomination and authenticity of bills are discriminated again at the bill discriminating unit 30; (7), (7') the bills having been discriminated are stored in the accommodating sections A and B of the recycle boxes 82 and 83 according to the corresponding denomination; and (8) a bill or bills, which the bill discriminating unit 30 could not discriminate or a bill or bills, of which reception is rejected due to a tilt or abnormal spacings between bills, are stored in the non-circulating box 80A.

In this case, it is possible to provide means for storing the result of discrimination of all bills stored in the temporary storage box 40 at the time of counting the deposited money, whereby the bill accommodating box may be designated based upon its stored content. This construction can shorten a processing time required for designating the bill accommodating box compared to the former case.

Figure 9:
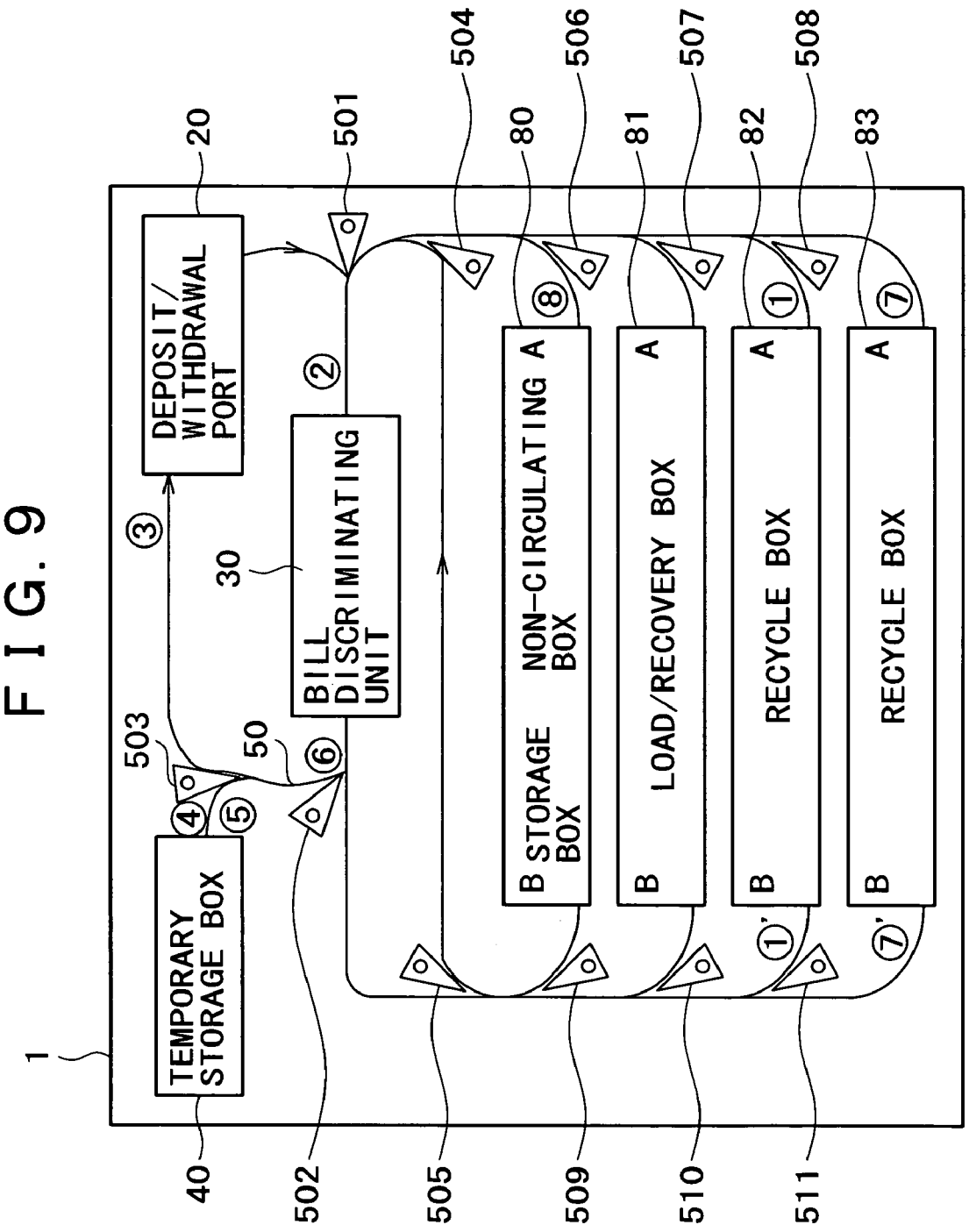
FIG. 9 is a typical sectional view showing a construction of a bill transport path according to the first embodiment of the invention (No. 3)

The withdrawal transaction is shown in FIG. 9. (1), (1') bills are taken out by predetermined numbers from the accommodating sections A and B per denomination of the recycle boxes 82 and 83. (2) the denomination of the taken-out bills is discriminated at the discriminating unit 30; and then, (3) stored in the deposit/withdrawal port 20 to be paid to the user; (4) a bill or bills, which the bill discriminating unit 30 could not discriminate are temporarily stored in the temporary storage box 40 like the case of counting the deposited money. Bills making up the balance are additionally taken out from the accommodating sections A and B of the recycle boxes 82 and 83.

Bills that could not be discriminated at the time of a withdrawal transaction and (5) stored in the temporary storage box 40 are delivered to the transport path 50, pass through the bill discriminating unit 30 where the denomination and authenticity are discriminated again, and the bills that can be discriminated and have denominations that can be stored in the accommodating sections A and B of the recycle boxes 82 and 83 are stored, while bills that cannot be discriminated are stored in the non-circulating box 80A. This can reduce the number of non-circulating bills, thereby providing enhancement of the fund efficiency.

Further, in the case where the user forgets to take out bills in the deposit/withdrawal port 20 after the withdrawal transaction, the transaction may be discontinued under the judgment of the machine as being abnormal while the bills are left in the deposit/withdrawal port 20 as they are. In the present embodiment, however, all bills are stored in the stacking box 80B for continuing the succeeding transaction.

Figure 10:
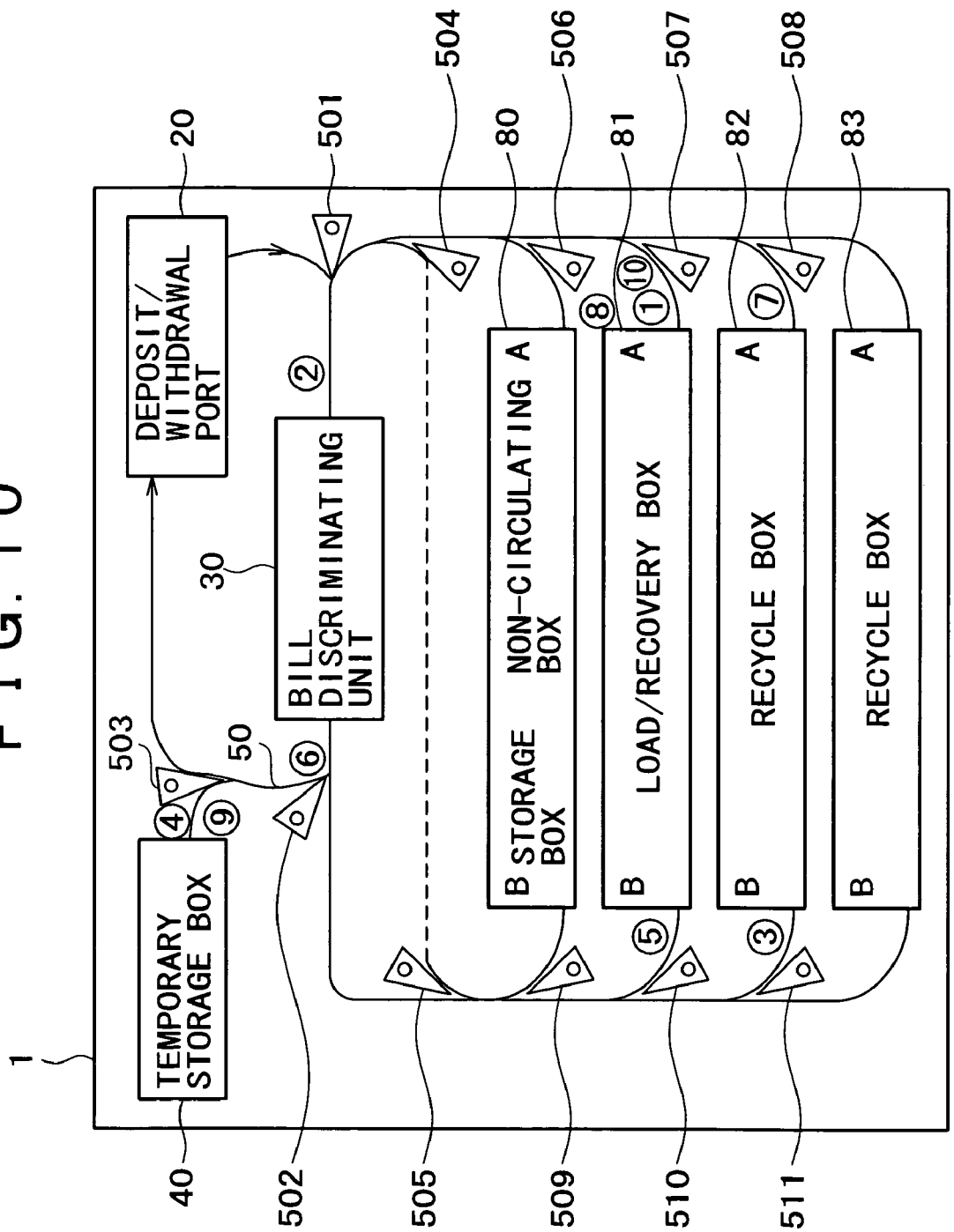
FIG. 10 is a typical sectional view showing a construction of a bill transport path according to the first embodiment of the invention (No. 4)

The load and recovery operations are shown in FIG. 10. The load and recovery operations can be performed for the recycle boxes 82 and 83 by use of the load/recovery box 81. At the time of loading, a clerk in charge sets at first bills of the denomination desired to be set into each accommodating section B of the recycle boxes 82 and 83 en bloc into the side of the accommodating section A of the load/recovery box 81 and the set bills of the denomination desired to be set into each accommodating section A of the recycle boxes 82 and 83 into the side of the accommodating section B of the load/recovery box 81, and then, the load/recovery box 81 is inserted to the bill recycle machine 1. (1) the bills delivered from the accommodating section A of the load/recovery box 81 are; (2) subjected to the discrimination of the denomination by the bill discriminating unit 30; and then, (3) stored in the accommodating section B of the designated recycle boxes 82 and 83 per denomination. The delivering side and the accepting side are made opposite to each other as described above, whereby a period when the bills pass through the transport path can be shortened, thus achieving a speedy load.

The bills whose denomination cannot be discriminated at the time of load are: (4) stored in the temporary storage box 40. (5) similarly, bills delivered from the accommodating section B of the load/recovery box 81 are: (6) subject to the discrimination of the denomination by the bill discriminating unit 30; and then, (7) stored in the accommodating section A of the designated recycle boxes 82 and 83 every denomination. (9) the bills stored in the temporary storage box 40 are delivered to the transport path 50 one by one; and (10) stored in the load/recovery box 81A (the accommodating section A of the load/recovery box 81 becomes anon-circulating box for the loaded bills).

In the case where all bills desired to be set to the recycle boxes 82 and 83 are set to the side of the accommodating section A of the load/recovery box 81, bills having a denomination that is to be set to the accommodating section A of the recycle boxes 82 and 83 pass through the bill discriminating unit 30, temporarily stored in the temporary storage box 40, and then, stored in the accommodating section A of the recycle boxes 82 and 83, resulting in the processing time being long.

Figure 11:
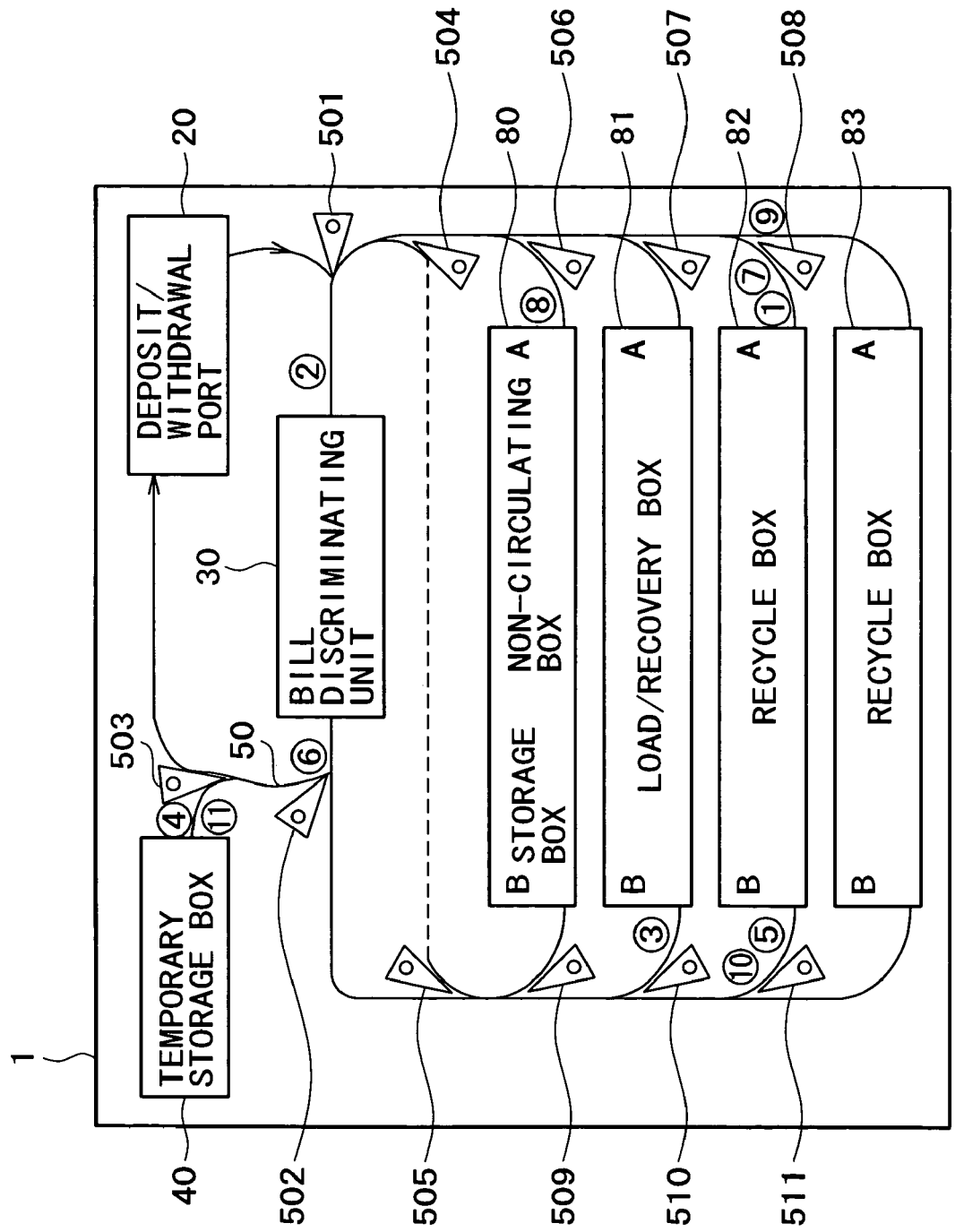
FIG. 11 is a typical sectional view showing a construction of a bill transport path according to the first embodiment of the invention (No. 5)

The recovery operation is an operation in which for example, when the recycle boxes 82 and 83 are full of bills, a clerk in charge does not extract bills individually from the recycle boxes 82 and 83, but a predetermined number of bills are automatically recovered from the recycle boxes 82 and 83 and accepted into the load/recovery box 81. The recovery operation is an operation in which bills are moved through a route reverse to that of the load operation, the detailed explanation of which is omitted. FIG. 11 shows a case for performing a careful-examination that is performed for a current-amount management for confirming the number and amount of bills stored in the recycle boxes 82 and 83. Since the accommodating section B of the load/recovery box 81 is empty at the time of operation, (1) the bills in the accommodating section A of the recycle box 82 are firstly delivered one by one; (2) subject to the discrimination of the denomination by the bill discriminating unit 30; and then, (3) stored in the accommodating section B of the load/recovery box 81. (4) at this time, the bills whose denomination could not be discriminated at the bill discriminating unit 30 are stored in the temporary storage box 40. This procedure is performed until the storage section A of the recycle box 82 becomes empty. (5) subsequently, the bills in the accommodating section B of the recycle box 82 are delivered one by one; (6) subject to the discrimination of the denomination by the bill discriminating unit 30; and then, (7) stored in the accommodating section A of the recycle box 82. At this time, the bills whose denomination could not be discriminated at the bill discriminating unit 30 are stored in the non-circulating box 80A. This procedure is performed until the accommodating section B of the recycle box 82 becomes empty. (9) Next, the bills in the accommodating section A of the recycle box 82 are returned to the accommodating section B of the recycle box 82 to be stored. (10) further, the bills in the accommodating section B of the load/recovery box 81 are returned to the accommodating section A of the recycle box 82 to be stored. The bills are delivered one by one to the transport path 50 and (10) stored in the load/recovery box 81A. (11) the bills stored in the temporary storage box 40 are stored in the non-circulating box A.

The same procedure is performed for the bills in the accommodating sections A and B of the recycle box 83 for confirming the number and amount of the bills stored in the recycle boxes 82 and 83.

Figure 12:
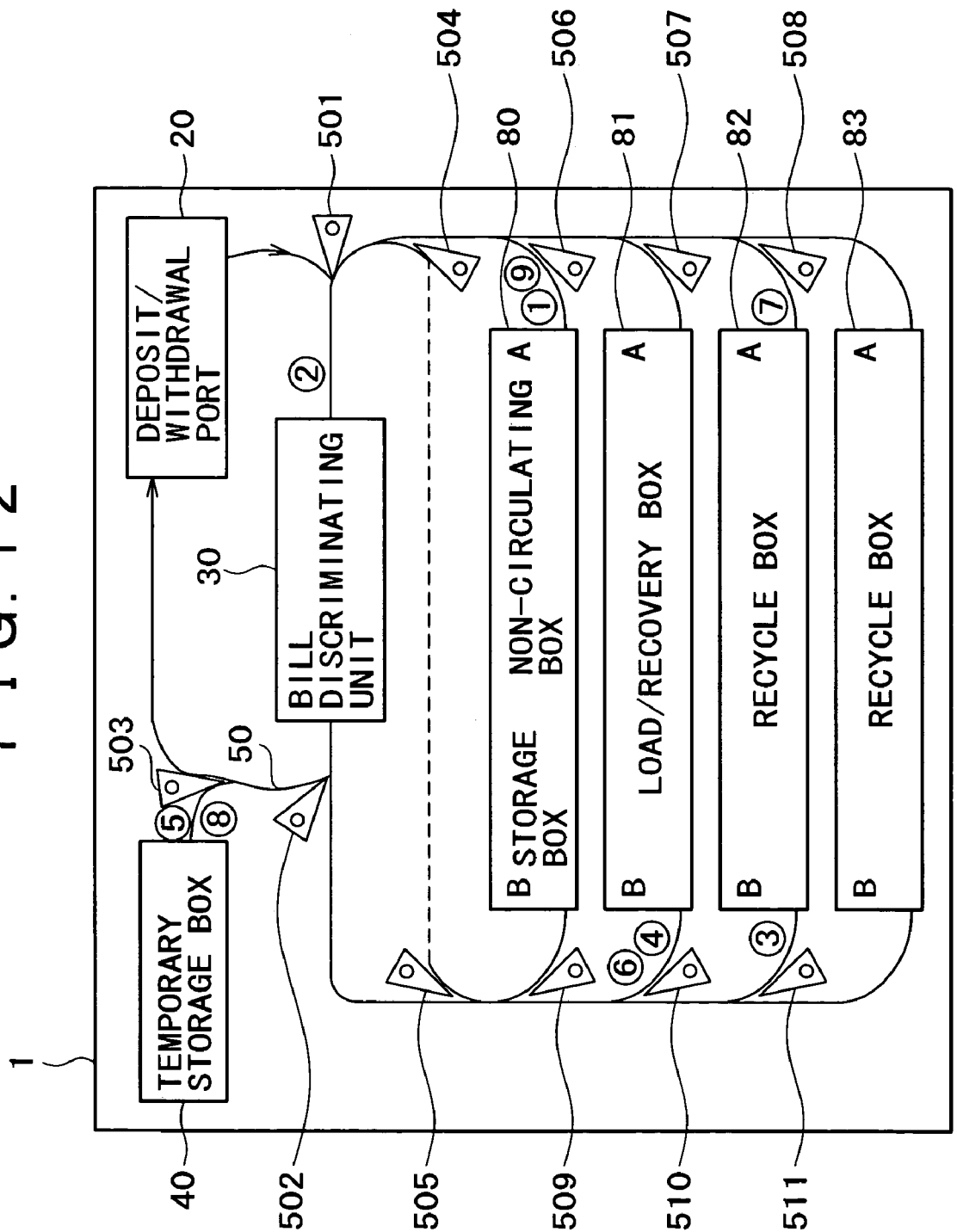
FIG. 12 is a typical sectional view showing a construction of a bill transport path according to the first embodiment of the invention (No. 6)

FIG. 12 shows re-discrimination of the non-circulated bills that is executed for discriminating again the bills stored in the non-circulating box 80A at the bill discriminating unit 30 and the discriminated bills are utilized for the withdrawal. (1) the bills in the non-circulating box 80A are delivered one by one; (2) subject to the discrimination of the denomination by the bill discriminating unit 30; and (3) after the denomination is confirmed, they are stored in the accommodating section B of the recycle box 82 or 83. (4) the bills that should be stored at the side of the accommodating section A of the recycle box 82 or 83 are temporarily stored in the empty accommodating section B of the load/recovery box 81. (5) at this time, the bills whose denomination could not be discriminated at the bill discriminating unit 30 are temporarily stored in the temporary storage box 40. This procedure is performed until the accommodating section A of the non-circulating box 80 becomes empty. (6) subsequently, the bills in the accommodating section B of the load/recovery box 81 are delivered one by one; and (7) stored at the side of the accommodating section A of the recycle box 82 or 83. (8) further, the bills in the temporary storage box 40 are delivered; and (9) returned to the non-circulating box 80A to be stored.

In the abovementioned explanation, the uppermost bill accommodating box 80 is used as the non-circulating/storage box, the second bill accommodating box 81 is used as the load/recovery box and the third and fourth bill accommodating boxes 81 are used as the recycle boxes, but these set positions are not necessarily fixed. These set positions may be freely changed to be used for each financial institution using an automated teller machine. Moreover, in the case where the load/recovery operation is not used like in the foreign countries, the bill storage box 81 may be used as the recycle box 81.

The accommodating capacity of each accommodating section A and B of each of the bill accommodating boxes 80 to 83 is A+B that is constant, so that the total amount is limited, but each accommodating capacity of the accommodating sections A and B is optional. Accordingly, in the case where the circulation amount of the newly designed bills and current bills is changed as the newly designed bills have been circulated since the issue thereof, as in the case where the bills are changed to newly designed bills, the recycle box for every denomination is used such that the accommodating section B is used for the current bills and the accommodating section A is used for the newly designed bills, whereby the accommodating capacity of each denomination is easy to be managed. It should be noted that the operability of the clerk in charge is improved by the configuration in the automated teller machine 101 wherein the bills of a denomination that are frequently used for the deposit and withdrawal so that the accommodating capacity is increased are set into the staking section A (front side) of the bill accommodating boxes 80 to 83, while bills of a denomination that are not frequently used are set into the accommodating section B (rear side), in the case of the front side operation type [FIG. 6A]. The reverse scheme is applied to the case of the back side operation type [FIG. 6B]. If the denomination to be handled is less, only the accommodating section at one side of the front and rear accommodating sections of the bill accommodating box can be used.

Figure 13:
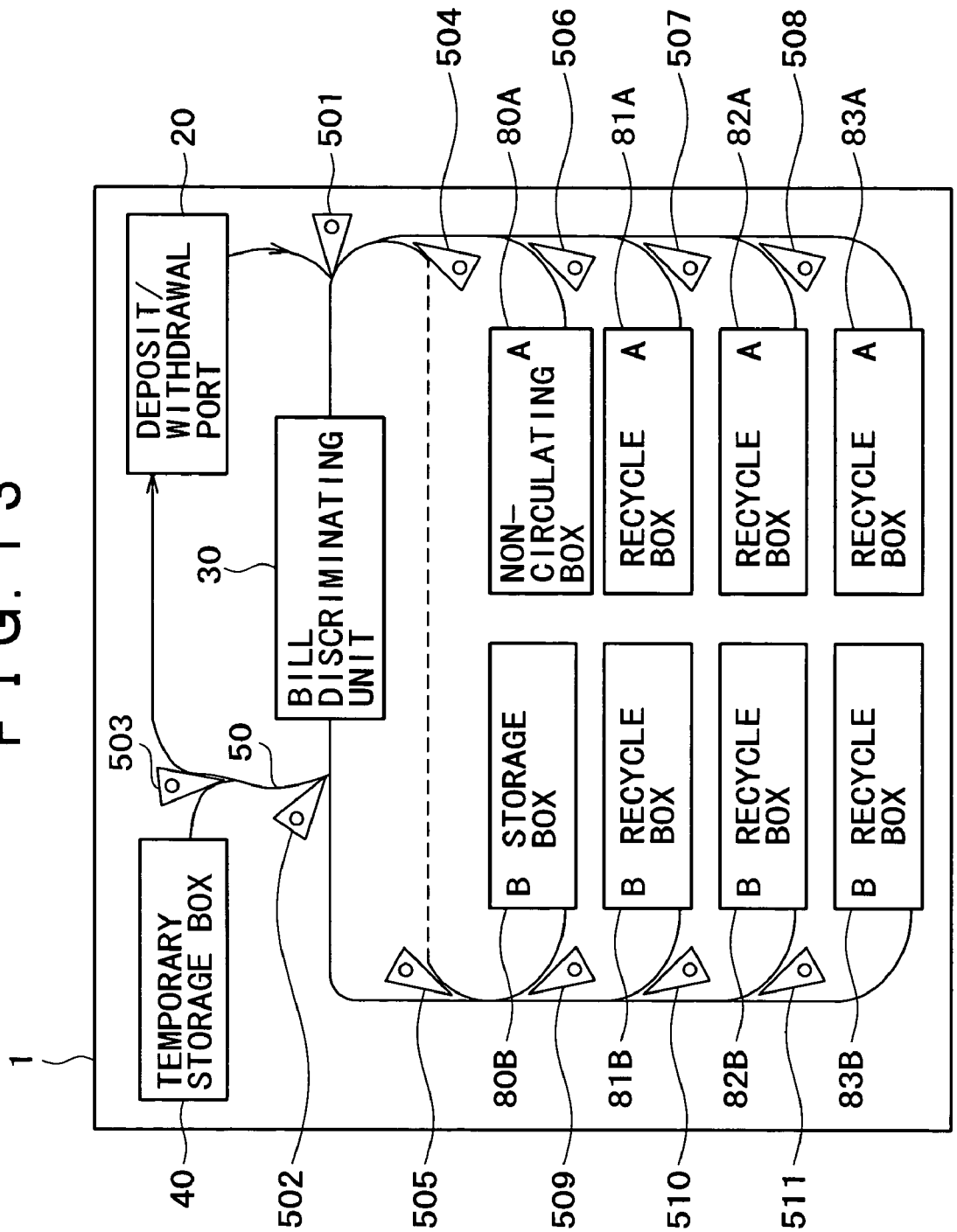
FIG. 13 is a side view showing a bill recycle machine according to a second embodiment of the invention.

Subsequently, a second embodiment of the present invention will be explained by using FIG. 13 that is a side view of the bill recycle machine 1. In FIG. 3, the bill accommodating section is divided into front and rear accommodating sections A and B in the bill accommodating boxes 80 to 83 of the bill recycle machine 1. However, as the bill accommodating capacity is increased, the mass of each of the bill accommodating boxes 80 to 83 is increased, with the result that it is difficult to be carried. In order to solve this problem, the accommodating sections A and B in the bill accommodating boxes 80 to 83 are separated from each other to be independent. As a result, the bill accommodating capacity can be doubled at maximum compared to the first embodiment. Although the depth of the bill recycle machine 1 is increased somewhat, its height is the same as that in the first embodiment. The bill accommodating boxes 80A, 80B, 81A, 81B, 82A, 82B, 83A and 83B are configured such that, although not shown, the front side (A) and the rear side(B) are connected with a lock mechanism when they are installed to the bill recycle machine 1. When, for example, the bill accommodating box 80B is pulled out from the back side with the handle, the bill accommodating box 80A is simultaneously pulled out, and the bill accommodating boxes 80A and 80B are separately carried by releasing the lock. It should be noted that they are not connected but the bill accommodating boxes 80A to 83A may be attached to and detached from the front side and the bill accommodating boxes 80B to 83B may be attached to and detached from the back side.

The load/recovery operation shown in FIG. 7 is not yet executed in foreign countries, so that all of the bill accommodating boxes 81A, 81B, 82A, 82B, 83A and 83B other than the non-circulating box 80A and the storage box 80B are used as the recycle box. The deposit transaction shown in FIG. 8 and the withdrawal transaction shown in FIG. 9 are the same except that a clerk in charge manually sets bills of the denomination desired to be set into the recycle boxes 81A, 81B, 82A, 82B, 83A and 83B. Further, the storage box 80B does not store the bills that the user forgets to take out but it may sometimes store bills that are discriminated to be forged bills at the bill discriminating unit 30.

Figure 14:
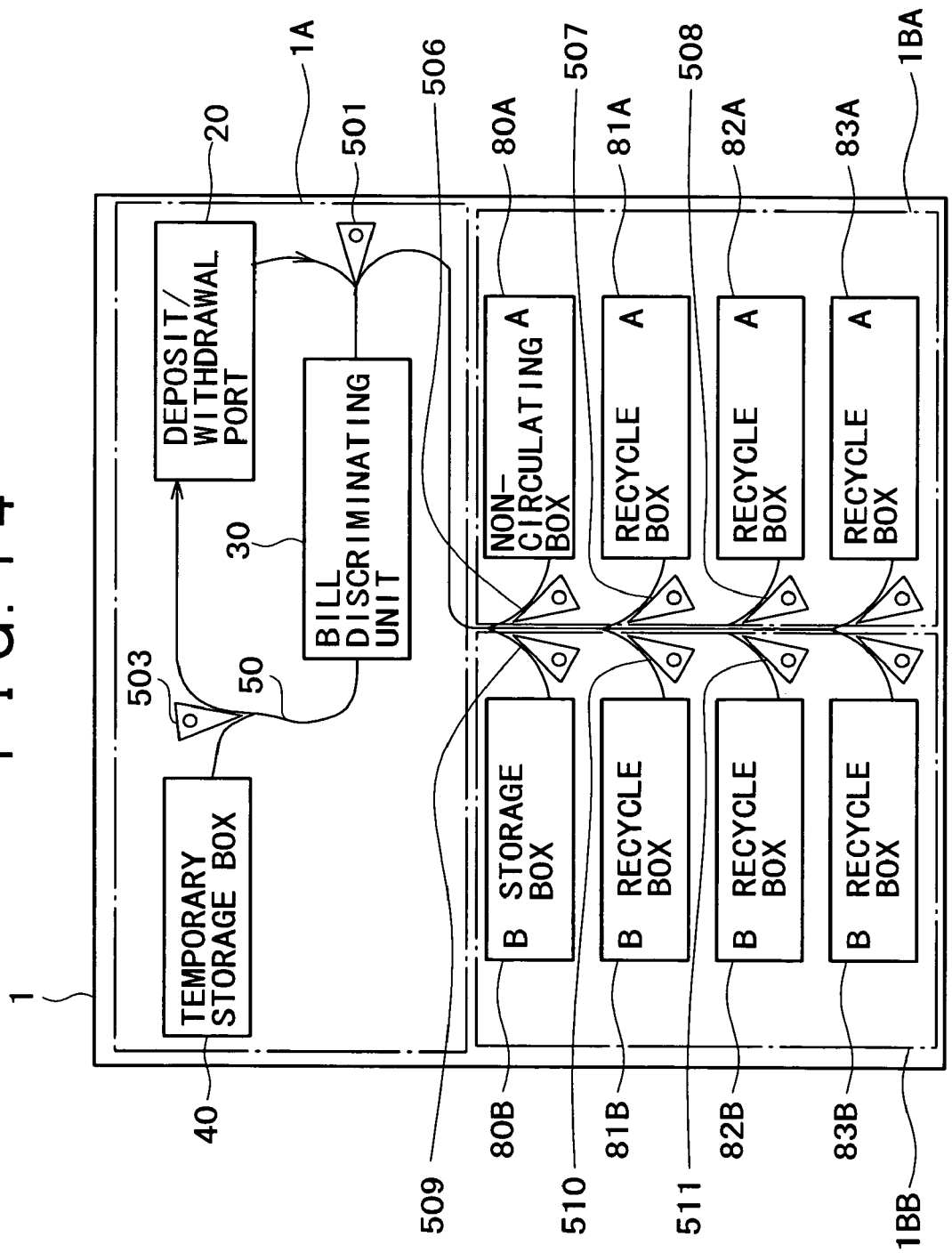
FIG. 14 is a side view showing a modified example of the bill recycle machine of the second embodiment according to the invention.

FIG. 14 shows the modified example. The lower bill mechanism 1B is divided into a lower front bill mechanism 1BA at the front side and a lower rear bill mechanism 1BB at the rear side, and the open/close transport paths 90A and 90B are arranged at the center. The bill accommodating boxes 80A, 81A, 82A and 83A are attached to and detached from the front side in the lower front bill mechanism 1BA at the front side, while the bill accommodating boxes 80B, 81B, 82B and 83B are attached to and detached from the back side in the lower rear bill mechanism 1BB at the back side. Further, the front-side open/close transport path 90A is operated by pulling out the lower front bill mechanism 1BA, while the rear-side open/close transport path 90A is operated by pulling out the lower rear bill mechanism 1BB.

According to the present invention, two denominations can be accommodated in a accommodating section of one bill accommodating box, as if it serves as two bill accommodating boxes, whereby much more denominations can be handled. The accommodating boxes of the present invention can always be changed to have the optimum operation state, for example, the accommodating position is changed to be set to an optimum position corresponding to the accommodating volume of each denomination or the denomination to be accommodated in each accommodating box is changed. Moreover, the present invention realizes a compact bill recycle machine that can cope with the space saving of the installation place and the space saving resulting from that a clerk in charge can manipulate the mechanism either from the front side or from the back side in correspondence to the installation place of the mechanism. In addition, it is possible to shorten a time that a clerk in charge spends on working for the bill accommodating box and to improve the function of managing cash and fund efficiency.

What is claimed is:

1. An automated teller machine comprising:
a bill recycle machine comprising:
a bill deposit/withdrawal port for accepting bills inputted by a user or delivering bills to the user;
a bill discriminating unit for discriminating bills;
plural bill accommodating boxes that store deposited bills to be accommodated therein, store bills for withdrawal or store bills that are not used for the deposit and withdrawal transaction; and
a bill transport path that passes through the bill discriminating unit for connecting the deposit/withdrawal port with the bill accommodating boxes; wherein
the plural bill accommodating boxes are vertically superimposed so that bills can be inputted to or delivered from a front side and a back side of the bill recycle machine and
at least one of the plural bill accommodating boxes has an accommodating section that is divided into a front-side accommodating section and a rear-side accommodating section and a push plate that is independently operated to a front side and a rear side, whereby the front-side accommodating section and rear-side accommodating section can store bills of different denominations.

2. The automated teller machine according to claim 1, wherein the bill accommodating box having the front-side accommodating section and rear-side accommodating section is a recycle box in which both the front-side accommodating section and rear-side accommodating section store bills used for both deposit and withdrawal.

3. The automated teller machine according to claim 2, wherein the bill accommodating box having the front-side accommodating section and rear-side accommodating section has a monolithic structure.

4. The automated teller machine according to claim 3, wherein the bill accommodating box having the front-side accommodating section and rear-side accommodating section can be used as any one of a bill accommodating box, a load/recovery box, a non-circulating box and a storage box depending upon a position of installation in the deposit/withdrawal machine.

5. The automated teller machine according to claim 4, comprising a function for delivering, from the non-circulating box, bills that are discriminated to be unusable for the withdrawal transaction at the bill discriminating unit and using them for the withdrawal transaction if they are discriminated to be usable for the withdrawal transaction at the bill discriminating unit.

6. The automated teller machine according to claim 3, wherein the bill accommodating box having the front-side accommodating section and rear-side accommodating section can be defined to be used as any one of the bill accommodating box, load/recovery box, non-circulating box and storage box regardless of the position of installation in the deposit/withdrawal machine.

7. The automated teller machine according to claim 6, comprising a function for delivering, from the non-circulating box, bills that are discriminated to be unusable for the withdrawal transaction at the bill discriminating unit and using them for the withdrawal transaction if they are discriminated to be usable for the withdrawal transaction at the bill discriminating unit.

8. The automated teller machine according to claim 2, wherein the front-side accommodating section and rear-side accommodating section of the bill accommodating box are separated from each other to be independent.

9. The automated teller machine according to claim 8, wherein the bill accommodating box having the front-side accommodating section and rear-side accommodating section can be used as any one of the bill accommodating box, load/recovery box, non-circulating box and storage box depending upon the position of installation in the deposit/withdrawal machine.

10. The automated teller machine according to claim 9, comprising a function for delivering, from the non-circulating box, bills that are discriminated to be unusable for the withdrawal transaction at the bill discriminating unit and using them for the withdrawal transaction if they are discriminated to be usable for the withdrawal transaction at the bill discriminating unit.

11. The automated teller machine according to claim 8, wherein the bill accommodating box having the front-side accommodating section and rear-side accommodating section can be defined to be used as any one of the bill accommodating box, load/recovery box, non-circulating box and storage box regardless of the position of installation in the deposit/withdrawal machine.

12. The automated teller machine according to claim 11, comprising a function for delivering, from the non-circulating box, bills that are discriminated to be unusable for the withdrawal transaction at the bill discriminating unit and using them for the withdrawal transaction if they are discriminated to be usable for the withdrawal transaction at the bill discriminating unit.

13. The automated teller machine according to claim 8, wherein the accommodating section is arranged on the bill transport path that connects the front side with rear side of the accommodating section, wherein bills delivered from the front-side accommodating section can be moved to the rear-side accommodating section to be stored and bills delivered from the rear-side accommodating section can be moved to the front-side accommodating section to be stored.

14. The automated teller machine according to claim 2, wherein the accommodating section is arranged on the bill transport path that connects the front side with rear side of the accommodating section, wherein bills delivered from the front-side accommodating section can be moved to the rear-side accommodating section to be stored and bills delivered from the rear-side accommodating section can be moved to the front-side accommodating section to be stored.

15. The automated teller machine according to claim 1, wherein the accommodating section is arranged on the bill transport path that connects the front side with rear side of the accommodating section, wherein bills delivered from the front-side accommodating section can be moved to the rear-side accommodating section to be stored and bills delivered from the rear-side accommodating section can be moved to the front-side accommodating section to be stored.

16. An operation method of an automated teller machine provided with plural bill accommodating boxes that are vertically superimposed to have a construction that bills can be inputted to and delivered from a front side and a back side of a bill recycle machine and at least one of the plural bill accommodating boxes has an accommodating section that is divided into a front-side accommodating section and a rear-side accommodating section and a push plate that is independently operated to a front side and a rear side, whereby the front-side accommodating section and rear-side accommodating section can store bills of different denominations, comprising the steps of:
  deciding that one of the bill accommodating boxes is used as a load box;
  deciding that another one or other plural boxes are used as recycle boxes; and
  setting bills that are to be accommodated into one of the front-side and rear-side accommodating sections of the recycle box are set to the other one of the front-side and rear-side accommodating sections of the load box.

17. An operation method of an automated teller machine provided with plural bill accommodating boxes that are vertically superimposed to have a construction that bills can be inputted and delivered from a front side and a back side of a bill recycle machine and at least one of the plural bill accommodating boxes has a accommodating section that is divided into a front-side accommodating section and a rear-side accommodating section and a push plate that is independently operated to a front side and a rear side, whereby the front-side accommodating section and rear-side accommodating section can store bills of different denominations, comprising the steps of:
  deciding that at least a part of the bill accommodating boxes is used as a non-circulating box;
  deciding that another one or the other plural bill accommodating boxes are used as recycle boxes;
  passing bills that cannot be discriminated at the time of a withdrawal transaction to thereby be stored in a temporary storage box through the bill discriminating unit for discriminating again a denomination and authenticity thereof;
  storing bills that are discriminable at the discrimination step into the recycle box; and
  storing bills that are indiscriminable at the discrimination step into the non-circulating box.

18. An operation method of an automated teller machine provided with plural bill accommodating boxes that are vertically superimposed to have a construction that bills can be inputted and delivered from a front side and a back side of a bill recycle machine and at least one of the plural bill accommodating boxes has a accommodating section that is divided into a front-side accommodating section and a rear-side accommodating section and a push plate that is independently operated to a front side and a rear side, whereby the front-side staking section and rear-side accommodating section can store bills of different denominations, comprising the steps of:
  deciding that the plural bill accommodating boxes are used as recycle boxes;
  allocating the recycle box per denomination; and
  deciding that one of the front-side and rear-side of the bill accommodating box allocated as the recycle box per denomination is used for a accommodating section for current bills and the other one is used for a accommodating section for newly designed bills.

* * * * *